US008224098B2

(12) United States Patent
Adabala

(10) Patent No.: US 8,224,098 B2
(45) Date of Patent: Jul. 17, 2012

(54) FAÇADE RENDERING SYSTEM

(75) Inventor: Neeharika Adabala, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 11/763,989

(22) Filed: Jun. 15, 2007

(65) Prior Publication Data

US 2008/0310733 A1    Dec. 18, 2008

(51) Int. Cl.
    *G06K 9/46* (2006.01)
(52) U.S. Cl. ......... 382/207; 382/100; 382/106; 382/325
(58) Field of Classification Search .................. 382/100, 382/106, 108, 109, 113, 181, 207, 276, 284, 382/286, 291, 325
    See application file for complete search history.

(56) References Cited

U.S. PATENT DOCUMENTS

| | | | |
|---|---|---|---|
| 6,009,190 A | 12/1999 | Szeliski et al. | |
| 6,031,541 A | 2/2000 | Lipscomb et al. | |
| 6,184,898 B1 | 2/2001 | Rice et al. | |
| 6,563,529 B1 | 5/2003 | Jongerius | |
| 6,895,126 B2 | 5/2005 | Di Bernardo et al. | |
| 7,106,328 B2 | 9/2006 | Royan | |
| 7,522,269 B2* | 4/2009 | Ogisu et al. | 356/32 |
| 7,548,650 B2* | 6/2009 | Qamhiyah et al. | 382/181 |
| 2001/0001137 A1 | 5/2001 | Alexander | |
| 2004/0252889 A1* | 12/2004 | Liu et al. | 382/190 |
| 2005/0128212 A1 | 6/2005 | Edecker et al. | |
| 2005/0271274 A1* | 12/2005 | Urano et al. | 382/173 |
| 2006/0107616 A1 | 5/2006 | Ratti et al. | |
| 2006/0188143 A1* | 8/2006 | Strassenburg-Kleciak | 382/154 |
| 2006/0238379 A1 | 10/2006 | Kimchi et al. | |
| 2008/0008385 A1* | 1/2008 | Ogisu et al. | 382/181 |
| 2009/0128546 A1* | 5/2009 | Masuda | 345/419 |
| 2010/0104141 A1* | 4/2010 | Kmiecik et al. | 382/108 |

OTHER PUBLICATIONS

Müller et al. "Procedural Modeling of Buildings" Proceedings of ACM Siggraph 2006.*
DeCarlo, Doug and Santella, Anthony, "Stylization and Abstration of Photographs," SIGGRAPH 2002 (8 pages).
Agrawala, Maneesh et al., "Rendering Effective Route Maps: Improving Usability Through Generalization," SIGGRAPH 2001 (10 pages).
Panoramic Maps Collection, The Library of Congress, Oct. 19, 1998 (2 pages) http://memory.loc.gov/ammem/pmhtml/panhome.html [Accessed Mar. 27, 2007].
International Search Report for Application No. PCT/US2008/064544; Applicant: Microsoft Corporation; Date of Mailing: Oct. 15, 2008 (3 pages).

* cited by examiner

*Primary Examiner* — Stephen R Koziol
(74) *Attorney, Agent, or Firm* — Perkins Coie LLP

(57) ABSTRACT

A façade rendering system is described. In various embodiments, the façade rendering system identifies horizontal waveforms and vertical waveforms from an image of a structure, combines the identified horizontal and vertical waveforms to generate façade waveforms that model a façade of the structure, and renders the façade waveforms as a façade for the structure. The façade rendering system can include or employ information about the structure from which to create waveform information, waveform information to create a façade waveform for modeling the structure, and a component that renders the structure based on the waveform information.

20 Claims, 5 Drawing Sheets

FAçADE RENDERING SYSTEM

BACKGROUND

Oblique panoramic maps are panoramic maps that depict geographic areas in an oblique angle other than ninety degrees to depict map features, such as buildings or other landmarks, in relation to one another. At ninety degrees, the viewpoint of a map is from directly above the map features. Conversely, an oblique angle employs an angular viewpoint that is between zero degrees and ninety degrees to illustrate map features in a more representative depiction.

Cartographers in the 16th to early 19th centuries commonly employed oblique panoramic urban maps to illustrate urban areas. These maps made it easy for viewers to recognize landmark objects. However, the use of such maps disappeared with time as creating these types of maps involved extensive manual effort by skilled cartographers. Moreover, modern urban areas make such maps difficult to produce and use because of the large number of objects (e.g., buildings) that need to be included to make a representative map.

With the advent of modern technology, detailed modeling information is now available for many urban areas. Modeling information includes measurements and relative positions of objects in an area. Advances in computer graphics and visualization techniques have made it easier to render (e.g., draw or display) panoramic maps using this modeling information without the expense of sophisticated manual labor of cartographers. As an example, satellite imagery can be employed to render buildings on maps. This satellite imagery can be employed to render each building's façade. A façade of a building is a face of a building that generally includes windows and walls. For example, a skyscraper may have a different façade than a townhouse in terms of windows of different sizes and shapes. Users can distinguish one building from another based on the buildings' façades.

However, satellite imagery is unavailable from several positions and is often captured by satellites at different times of the day, and so shadows of objects can be in inconsistent places. Thus, when a viewer changes the viewpoint or zooms a map in or out, the buildings may not be illustratable in a visually pleasing form because of these inconsistencies. Moreover, collecting and storing satellite imagery from multiple viewpoints and times of day can be costly in terms of time and storage. However, not storing this information makes it difficult to reproduce façades of buildings.

SUMMARY

A façade rendering system is described. The façade rendering system can render a façade of a building or other structure as a single unit instead of as an aggregation of parts by representing building façades using waveform functions ("waveforms") to represent openings and orientations of parts of the façades. The façade rendering system can identify horizontal and vertical waveforms to represent portions of a façade, combine the waveforms to generate façade waveforms that model the façade, and render the façade waveforms as a façade for the structure. The façade rendering system can identify (e.g., by selecting or computing) waveforms for a building based on an analysis of the building's façades. This analysis can be performed manually or automatically to classify building façades according to a façade complexity classification. This classification can be performed by analyzing an image of the building and an orientation in which the façade is to be rendered. The façade rendering system can select or compute one or more waveforms based on this classification. The façade rendering system can then combine selected or computed waveforms both in the horizontal and in the vertical extents of a façade to represent the façade, such as to represent the façade's openings (e.g., windows) and walls. When the façade rendering system combines multiple waveforms it can use a multiplicative operation so that whenever any of the waveforms indicates a zero, the combined waveform also indicates zero. This portion of a waveform represents a window. Conversely, when the combination is not zero, the combined waveform can represent a wall or other non-window region of the façade. The façade rendering system can also vary attributes of the selected or computed waveforms, such as the length of a cycle of the waveform and the width of a curve within the cycle. As examples, the façade rendering system can vary attributes to increase or decrease the width or height of windows. By combining waveforms to create the appearance of a façade, the façade rendering system can quickly render façades without storing large amounts of data, such as satellite imagery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
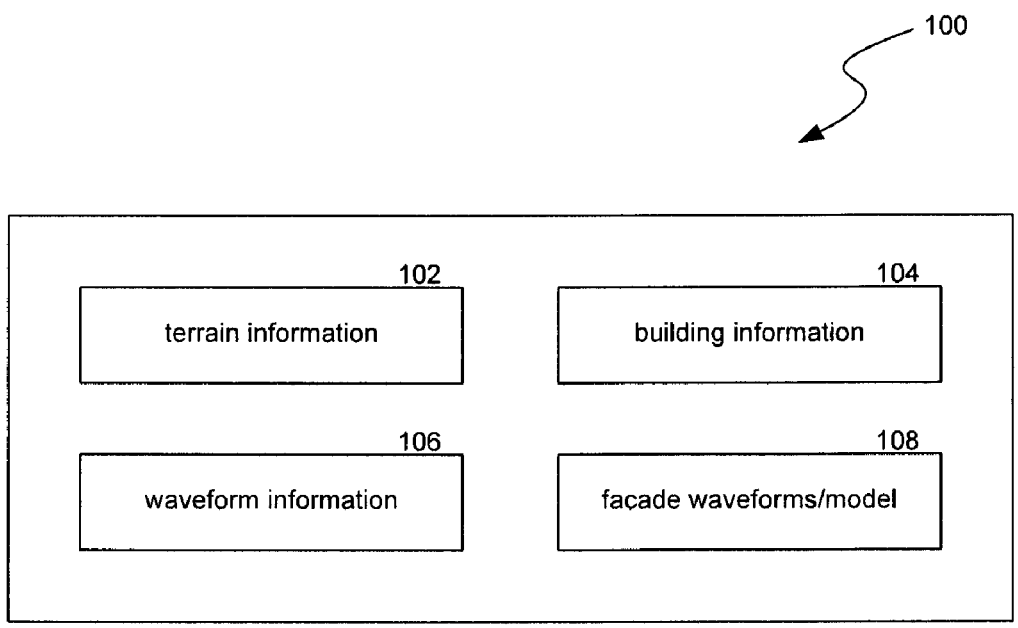
FIG. 1 is a block diagram illustrating components of a façade rendering system in some embodiments.

A façade rendering system is described. In various embodiments, the façade rendering system can render a façade of a building or other structure as a single unit instead of as an aggregation of parts by representing building façades using waveform functions ("waveforms") to represent openings and orientations of parts of the façades. A waveform is a signal shape, such as sinusoidal, square, triangular, sawtooth, and so forth. The façade rendering system can identify horizontal and vertical waveforms to represent portions of a façade, combine the waveforms to generate façade waveforms that model the façade, and render the façade waveforms as a façade for the structure. The façade rendering system can identify (e.g., by selecting or computing) waveforms for a building based on an analysis of the building's façades. This analysis can be performed manually or automatically to classify building façades according to a façade complexity classification based on whether façades have (1) significant wall and window regions; (2) only window regions; (3) a horizontal emphasis of layers of windows and walls; or (4) a vertical emphasis resulting from alternate columns of windows and walls. This classification can be performed by analyzing an image of the building and an orientation in which the façade is to be rendered. As an example, the façade rendering system can employ triangular waveforms to represent rectangular windows that are oriented at an angle to a viewpoint. The façade rendering system can select or compute one or more waveforms based on this classification. As an example, the façade rendering system can select one set of waveforms for buildings with many complex wall and window regions and another set of waveforms for buildings with simpler window regions. The façade rendering system can then combine selected or computed waveforms both in the horizontal and in the vertical extents of a façade to represent the façade, such as to represent the façade's openings (e.g., windows) and walls. When the façade rendering system combines multiple waveforms it can use a multiplicative operation so that whenever any of the waveforms indicates a zero, the combined waveform also indicates zero. This portion of a waveform represents a window. Conversely, when the combination is not zero, the combined waveform can represent a wall or other non-window region of the façade. Thus, if the waveform indicates a wall in either the horizontal or vertical extents of a façade, the façade rendering system renders the result as a portion of the wall. If, on the other hand, the waveforms in both the horizontal and vertical directions indicate a window (e.g., they are zero), the façade rendering system renders the position as a window. Thus, when the façade rendering system combines waveforms horizontally and vertically to represent a building, the combination can represent the entire building façade. The façade rendering system can also vary attributes of the selected or computed waveforms, such as the length of a cycle of the waveform and the width of a curve within the cycle. As examples, the façade rendering system can vary attributes to increase or decrease the width or height of windows. By combining waveforms to create the appearance of a façade, the façade rendering system can quickly render façades without storing large amounts of data, such as satellite imagery. The façade rendering system can then employ the combined waveforms to render windows and walls of the façade.

In various embodiments, a user can provide a level of abstraction to the building façade rendering system. Alternatively, the façade rendering system can compute an appropriate level of abstraction based on the user's selection of a zoom level. By creating abstractions, the façade rendering system can avoid extraneous details and make the map appear less cluttered. The façade rendering system can employ the level of abstraction to tune the waveforms by varying the waveforms' parameters. As an example, when a high level of detail is desired, such as when the zoom level is very close, the façade rendering system can combine multiple simple or complex waveforms to represent the façade. Alternatively, when the zoom level is far or less detail can be rendered, the façade rendering system can use a smaller number of waveforms, such as a simple square waveform for both the vertical and horizontal extents. In some embodiments, the façade rendering system can receive as a parameter a number of waveforms to combine to model a façade. Thus, if a higher level of detail is required, the façade rendering system may receive a higher number of waveforms than if a lower level of detail is required. In various embodiments, the degree of façade abstraction need not be tied to zoom levels and can instead be a result of a style parameter that is chosen by the user. If the user wants abstract maps, then the user can use fewer waveforms, else if they would like a detailed map appearance, then the façade rendering system may use several waveforms for the same zoom level. In various embodiments, a user can vary a style parameter to cause the façade rendering system to change the level of abstraction.

In various embodiments, the façade rendering system can apply smoothing functions, such as a Fourier series, wavelets, or other mathematical functions to approximate waveforms. By applying smoothing functions, the façade rendering system removes jaggedness and aliasing problems that are typical of simpler waveforms. When aliasing occurs, rendered waveforms can contain undesirable distortions.

In various embodiments, the façade rendering system can create various styles of maps, such as by depicting aspects of the façades in various colors. As an example, a building at night can be simulated by coloring the background and walls black and coloring the windows with a lighter shade.

The façade rendering system enables structures to be rendered at various times of the day. The façade rendering system can employ various texturing techniques (e.g., using shading) to render the buildings during the day, at night, with interior lights, and so forth.

In some embodiments, the façade rendering system employs Fourier series to model building façades. By employing Fourier series, the façade rendering system is able to perform anti-aliasing implicitly by truncating the evaluation of high frequency components. As a result, windows and walls can be rendered without hard edges.

The façade rendering system will now be described with reference to the figures. FIG. 1 is a block diagram illustrating components of a façade rendering system in some embodiments. The façade rendering system 100 can include terrain information 102, building information 104, waveform information 106, and façade waveforms or model information 108. These components can be stored as databases, files, or other data storage types. The terrain information component 102 can include terrain-related information, such as from a geographical information system. The façade rendering system can employ the terrain information to render terrain on a map. The building information component 104 stores building-related information, such as dimensions and locations of buildings in an urban area. As an example, the building-related information can include the location (e.g., in GPS or Cartesian coordinates), width, length, height, shape, and so forth. The building information can include similar information for any structure, such as landmarks or other map features. In some embodiments, the building information can include satellite or other imagery of buildings, such as images that can be analyzed to produce waveforms. The waveform information component 106 can generate or store waveform information, such as waveforms based on an image of a building. The façade waveforms or model information 108 can include generated façade waveforms or other information that the façade rendering system can employ to render façades.

The computing devices on which the object façade rendering system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the object façade rendering system. In addition, the data structures and message structures may be stored or transmitted via a data transmission medium, such as a signal on a communications link. Various communications links may be employed, such as the Internet, a local area network, a wide area network, or a point-to-point dial-up connection.

The object façade rendering system may use various computing systems or devices, including personal computers, server computers, hand-held or laptop devices, multiprocessor systems, microprocessor-based systems, programmable consumer electronics, electronic game consoles, network PCs, minicomputers, mainframe computers, distributed computing environments that include any of the above systems or devices, and the like. The object façade rendering system may also provide its services to various computing systems, such as personal computers, cell phones, personal digital assistants, consumer electronics, home automation devices, and so on.

The object façade rendering system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
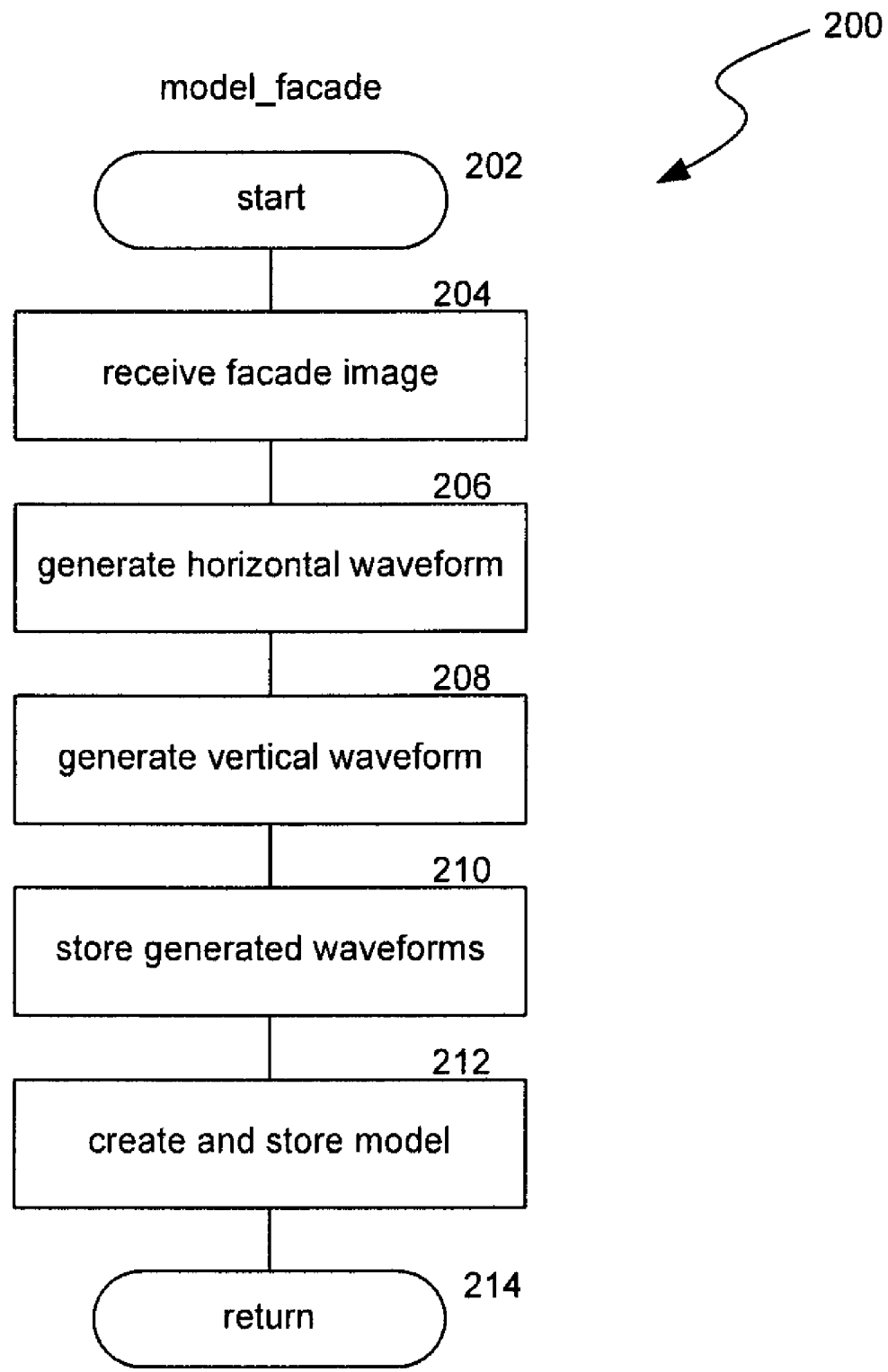
FIG. 2 is a flow diagram illustrating a model_façade routine invoked by the façade rendering system in some embodiments.

FIG. 2 is a flow diagram illustrating a model_façade routine 200 invoked by the façade rendering system in some embodiments. The façade rendering system can invoke the model_façade routine 200 to create a model of the façade based on an image of the façade. The routine begins at block 202. At block 204, the routine receives an image of a façade. At block 206, the routine generates a horizontal waveform based on the received image. At block 208, the routine generates a vertical waveform based on the received image. In some embodiments, a user may provide horizontal and vertical waveforms. The routine may employ one or more waveforms to represent the walls and windows of the façade represented by the image. As an example, the routine may employ square and triangular waveforms to represent the façade. At block 210, the routine stores the generated waveforms. At block 212, the routine creates and stores a model of the façade. The model can include an identification of one or more generated waveforms, in which orientation the waveforms are to be rendered, and attributes of the waveform. At block 214, the routine returns.

Figure 3:
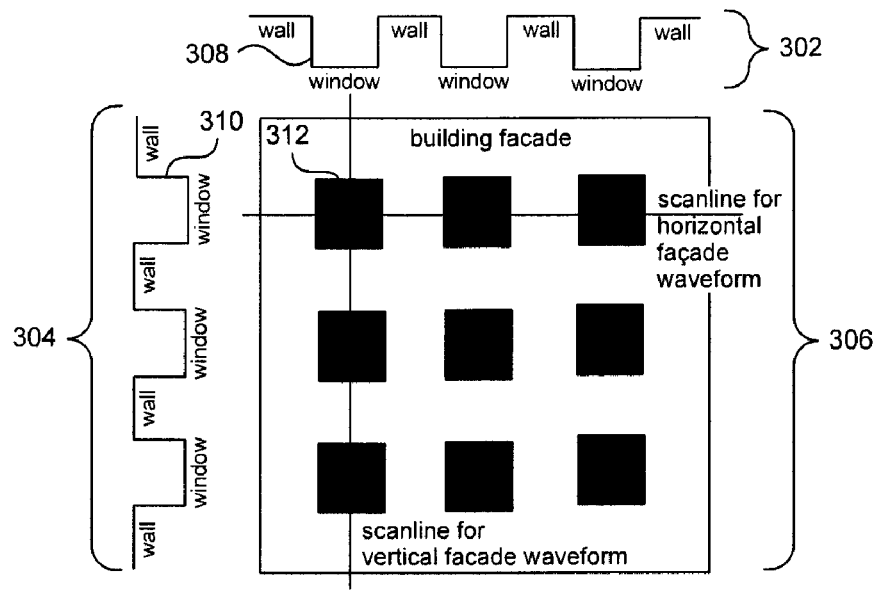
FIGS. 3-6 are waveform diagrams illustrating use of waveforms by the façade rendering system in various embodiments.

FIGS. 3-6 are waveform diagrams illustrating use of waveforms by the façade rendering system in various embodiments. FIG. 3 illustrates a façade 306 having nine windows similar to a window 312. The window 312 can be represented by a square waveform 302 in the horizontal extent and a square waveform 304 in the vertical extent. The window 312 is formed by a cycle 308 of the waveform 302 and a cycle 310 of the waveform 304. By employing a multiplicative operation, the façade rendering system renders the window 312 when both waveforms 302 and 304 indicate a zero (e.g., window). When either waveform 302 or 304 indicates non-zero (e.g., wall), the façade rendering system renders a wall. The façade rendering system can compute whether a window or wall is to be rendered by analyzing horizontal and vertical scanlines for the façade.

Figure 4:
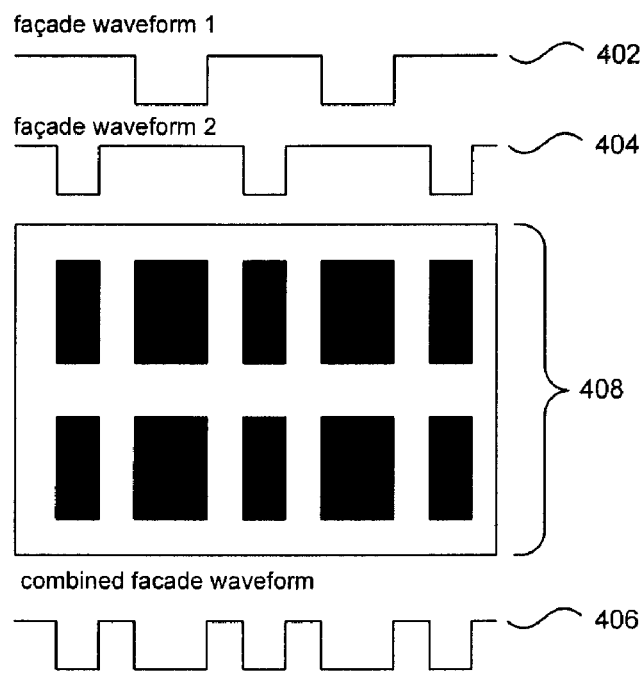

FIG. 4 illustrates a façade 408 that is rendered with slightly more complicated waveforms. The façade rendering system has employed two horizontal waveforms 402 and 404. When the waveforms 402 and 404 are combined, such as by using a multiplicative operation, a combined waveform 406 is produced. The illustrated façade 408 was rendered with the combined waveform 406 and a vertical waveform that is similar to the vertical waveform 304 that was employed during the rendering of the façade illustrated in FIG. 3.

Figure 5:
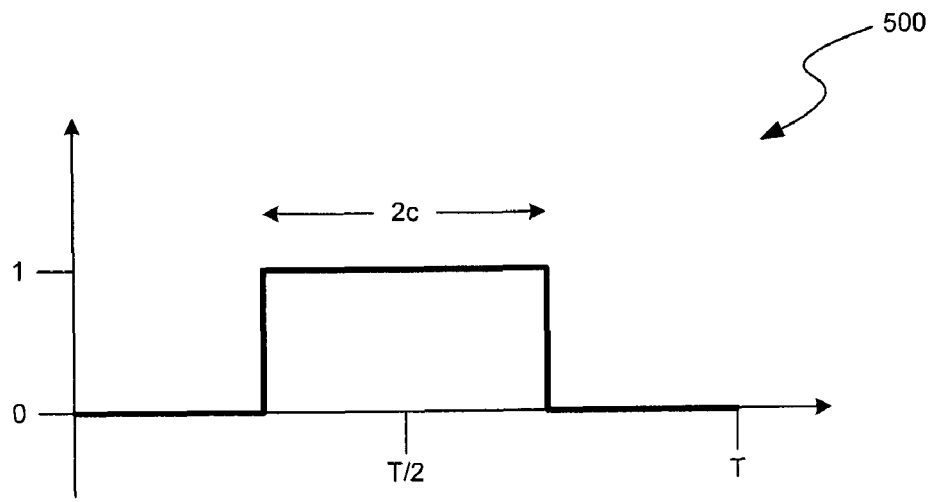

FIG. 5 illustrates a simple square waveform 500. In the vertical axis, the values are zero or one (non-zero). The waveform 500 can be approximated mathematically as follows:

$$f(t) = \frac{2c}{T} + \frac{2}{\pi}\sum_{n=1}^{\infty}\frac{(-1)^n}{n}\sin\left(\frac{2n\pi c}{T}\right)\cos\left(\frac{2n\pi t}{T}\right)$$

In this equation, T is the interval, 2c is the part of the interval that the function is non-zero, and n is the number of harmonics (e.g., the full interval) that are evaluated. As an example, when rendering the façade illustrated in FIG. 3, the waveform 302 would be evaluated three times whereas when rendering the façade illustrated in FIG. 4, the waveform 402 would be evaluated two times and the waveform 404 would be evaluated three times. The values for T and c can be selected based on an analysis of the image from which the waveforms are computed.

By employing smoothing techniques, the façade rendering system can align façades with the overall structure that is being rendered. Thus, for example, windows can be made to appear to be on the same plane as the façade of the structure. By aligning the façade waveforms with the structure and thereby smoothening waveform approximations, the façade will be consistent with the structure.

Figure 6:
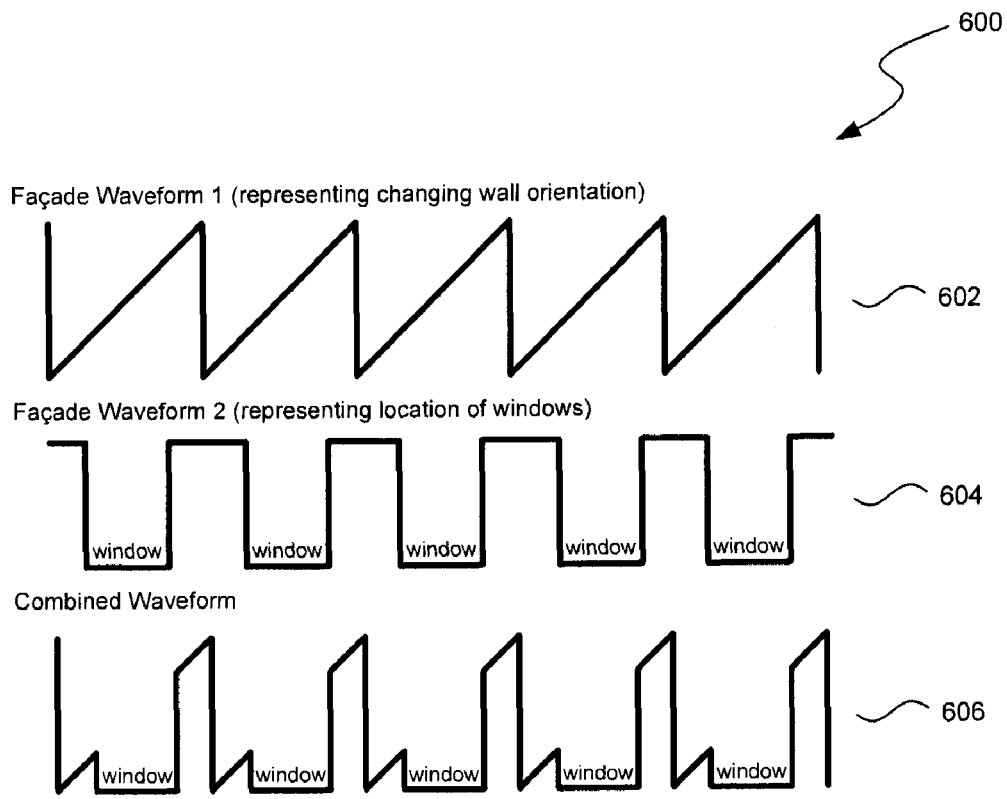

FIG. 6 is an illustration of a more complex waveform 600. A triangular waveform 602 and a square waveform 604 can be combined, such as by employing a multiplicative operation, to produce a waveform 606. The waveform 606 can represent a complex wall or window pattern, such as an angular orientation.

Figure 7:
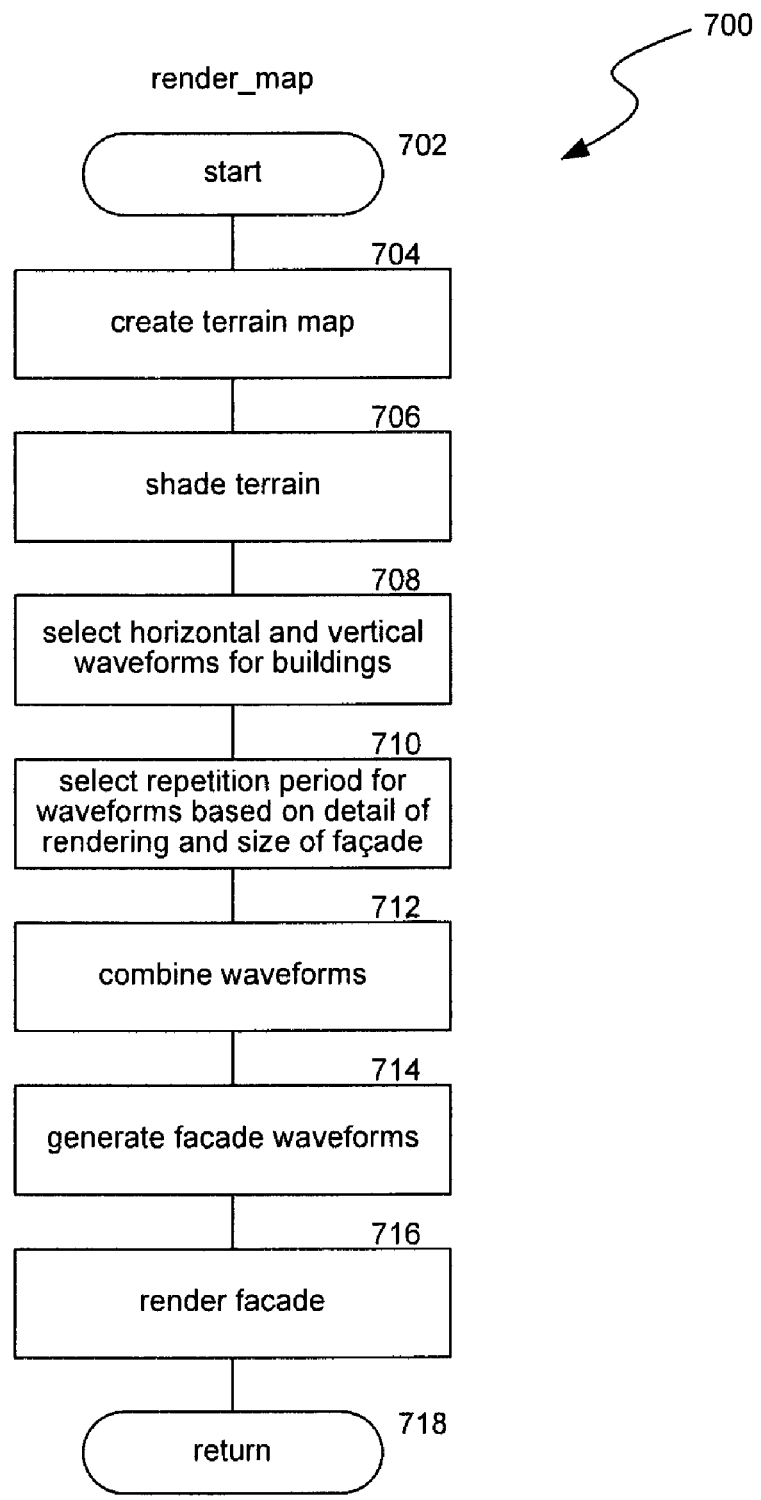
FIG. 7 is a flow diagram illustrating a render_map routine invoked by the façade rendering system in some embodiments.

FIG. 7 is a flow diagram illustrating a render_map routine 700 invoked by the façade rendering system in some embodiments. The façade rendering system can invoke the render_map routine 700 when rendering a map with structures, such as buildings, landmarks, and so forth. The routine begins at block 702. At block 704, the routine creates a terrain map. As an example, the routine can retrieve terrain information and render a portion of the information as a terrain map, e.g., based on how much can be displayed on a screen or printed on a page. At block 706, the routine can shade the rendered terrain, such as based on elevation information indicated by the terrain information. At block 708, the routine selects horizontal and vertical waveforms for one or more buildings that are to be rendered. At block 710, the routine selects a repetition period for the selected waveforms based on the amount of detail that is to be rendered. This repetition can be based on the rendering size (e.g., zoom level) that is selected for rendering the façade. At block 712, the routine combines and at block 714, the routine generates façade waveforms. At block 716, the routine renders the façade based on the combined and generated waveforms. In various embodiments, the routine may loop through the logic of blocks 708-716 for each building that is to be rendered. At block 718, the routine returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:
1. A method for rendering a façade of a structure, comprising:
identifying a horizontal waveform and a vertical waveform, the horizontal waveform for representing a hori- zontal portion of the façade and the vertical waveform for representing a vertical portion of the façade;
combining the identified horizontal and vertical waveforms to generate façade waveforms that model the façade; and
rendering the façade waveforms as a façade for the structure.

2. The method of claim 1 further comprising receiving an image of the façade and generating the horizontal and vertical waveforms based on the received image.

3. The method of claim 1 wherein the combining includes employing a multiplicative operation.

4. The method of claim 1 wherein when the façade waveforms indicate a zero, the method further comprises rendering a window region of the structure.

5. The method of claim 1 wherein when the façade waveforms do not indicate a zero, the method further comprises rendering a wall region of the structure.

6. The method of claim 1 further comprising receiving an indication of an amount of detail in which the façade is to be rendered and selecting a repetition period for the identified horizontal and vertical waveforms based on the indicated amount of detail.

7. The method of claim 1 further comprising creating a terrain map, rendering the terrain map, and shading the terrain map wherein the rendering includes drawing the structure and a façade on the terrain.

8. The method of claim 1 further comprising classifying the structure to facilitate identification of waveforms.

9. The method of claim 8 wherein the classification includes determining, when the structure is a building, whether the structure contains (a) wall and window regions; (b) only window regions; (c) a horizontal emphasis identified by layers of windows and walls; or (d) a vertical emphasis identified by alternate columns of windows and walls.

10. A computer-readable storage device storing computer-executable instructions that, when executed, cause a computer system to perform a method for rendering a façade of a structure, the method comprising:
receiving an abstraction level;
receiving a horizontal waveform and a vertical waveform, the horizontal waveform for representing a horizontal portion of the façade and the vertical waveform for representing a vertical portion of the façade;
combining, using a multiplicative operation, the received horizontal and vertical waveforms to generate façade waveforms that model the façade;
varying a parameter of at least one of the identified waveforms based on the abstraction level;
storing façade waveforms; and
rendering the façade of the structure using the stored façade waveforms.

11. The computer-readable storage device of claim 10 wherein the parameter is a dimension attribute of a received waveform.

12. The computer-readable storage device of claim 11 wherein the method further comprises varying a length attribute of a received waveform.

13. The computer-readable storage device of claim 11 wherein the method further comprises varying a width attribute of a received waveform.

14. The computer-readable storage device of claim 10 wherein the method further comprises determining to render a window when the façade waveforms indicate a zero for a position.

15. The computer-readable storage device of claim 10 wherein the method further comprises determining to render a wall when the façade waveforms do not indicate a zero for a position.

16. The computer-readable storage device of claim 10 wherein the abstraction level specifies a desired level of detail for the façade.

17. The computer-readable storage device of claim 16 wherein the abstraction is based on a zoom level.

18. The computer-readable storage device of claim 16 wherein the abstraction level is controlled by combining more or fewer waveforms.

19. The computer-readable storage device of claim 10 further comprising approximating the façade waveform by applying a smoothing function.

20. A system for rendering a façade of a structure, comprising:
a processor and one or more memories;
information about the structure stored on the one or more memories;
waveform information stored on the one or more memories that is employed to create a façade waveform for modeling the structure wherein the façade waveform represents a façade of the structure, the stored waveform information based on a mathematical combination of two waveforms representing a structure in two orthogonal directions, each waveform compiled in part by identifying window locations; and
a component executed by the processor that renders the waveform information.

* * * * *